US011232001B2

(12) United States Patent
Botelho et al.

(10) Patent No.: US 11,232,001 B2
(45) Date of Patent: Jan. 25, 2022

(54) CREATION OF VIRTUAL MACHINE PACKAGES USING INCREMENTAL STATE UPDATES

(71) Applicant: Rubrik, Inc., Palo Alto, CA (US)

(72) Inventors: Fabiano Botelho, Cupertino, CA (US); Arpit Agarwal, Karnataka (IN); Sai Kiran Katuri, Karnataka (IN)

(73) Assignee: Rubrik, Inc., Palo Alto, CA (US)

( * ) Notice: Subject to any disclaimer, the term of this patent is extended or adjusted under 35 U.S.C. 154(b) by 5 days.

(21) Appl. No.: 15/882,968

(22) Filed: Jan. 29, 2018

(65) Prior Publication Data
US 2019/0235971 A1  Aug. 1, 2019

(51) Int. Cl.
*G06F 11/14* (2006.01)
*G06F 9/455* (2018.01)
*G06F 8/65* (2018.01)

(52) U.S. Cl.
CPC ............ *G06F 11/1469* (2013.01); *G06F 8/65* (2013.01); *G06F 9/45558* (2013.01); *G06F 11/1446* (2013.01); *G06F 2009/45562* (2013.01); *G06F 2201/84* (2013.01)

(58) Field of Classification Search
CPC .... G06F 11/1469; G06F 8/65; G06F 9/45558; G06F 2009/45562; G06F 2201/84
See application file for complete search history.

(56) References Cited

U.S. PATENT DOCUMENTS

| 9,311,328 | B2 * | 4/2016 | Patil ................... G06F 16/1824 |
| 2006/0010176 | A1 * | 1/2006 | Armington ........... G06F 9/4856 |
| 2007/0244938 | A1 * | 10/2007 | Michael ................ G06F 16/128 |
| 2009/0249284 | A1 * | 10/2009 | Antosz ................ H04L 41/5054 |
|  |  |  | 717/104 |

(Continued)

FOREIGN PATENT DOCUMENTS

WO  2019148085  8/2019

OTHER PUBLICATIONS

"International Application Serial No. PCT US2019 015388, International Search Report dated Apr. 25, 2019", 2 pgs.

(Continued)

*Primary Examiner* — Meng Ai T An
*Assistant Examiner* — Willy W Huaracha
(74) *Attorney, Agent, or Firm* — Holland & Hart LLP

(57) ABSTRACT

Described herein are systems and methods that manage machine backups, including the creation of virtual machine packages sufficient to instantiate virtual machines corresponding to the backups. In one aspect, a compute infrastructure includes many machines, which may be either physical or virtual. From time to time, snapshots of the states of these target machines are pulled and saved. Virtual machine packages corresponding to these snapshots are also created. A virtual machine package can be used to instantiate a virtual machine (VM) emulating the target machine with the saved state on a destination virtual machine platform. At some point, the initial VM package for a target machine is (Continued)

created by converting the snapshot to a VM package. However, this may take a long time. Later VM packages can instead be created by updating a prior VM package according to differences between the corresponding snapshots, rather than performing the full conversion process.

13 Claims, 13 Drawing Sheets

(56) References Cited

U.S. PATENT DOCUMENTS

| | | | |
|---|---|---|---|
| 2009/0313503 A1 | 12/2009 | Atluri et al. | |
| 2009/0328225 A1* | 12/2009 | Chambers | G06F 21/10 726/26 |
| 2010/0049930 A1* | 2/2010 | Pershin | G06F 11/1451 711/162 |
| 2011/0022812 A1* | 1/2011 | van der Linden et al. | G06F 9/5077 711/163 |
| 2011/0113234 A1* | 5/2011 | Augenstein | G06F 3/0605 713/150 |
| 2011/0252208 A1* | 10/2011 | Ali | G06F 11/1451 711/162 |
| 2012/0266019 A1 | 10/2012 | Sim-tang | |
| 2013/0290781 A1 | 10/2013 | Chen et al. | |
| 2014/0282525 A1 | 9/2014 | Sapuram et al. | |
| 2015/0177997 A1* | 6/2015 | Warszawski | G06F 9/45558 711/162 |
| 2015/0347165 A1* | 12/2015 | Lipchuk | G06F 9/45558 718/1 |
| 2016/0124764 A1* | 5/2016 | Nithrakashyap | G06F 16/13 718/1 |
| 2016/0124977 A1* | 5/2016 | Jain | G06F 16/84 707/649 |
| 2016/0283329 A1* | 9/2016 | Natanzon | G06F 11/1464 |
| 2016/0364255 A1* | 12/2016 | Chefalas | G06F 8/63 |
| 2018/0052703 A1* | 2/2018 | Rayanagouda | G06F 21/564 |
| 2020/0310849 A1* | 10/2020 | Laurence | G06F 9/45558 |

OTHER PUBLICATIONS

"International Application Serial No. PCT US2019 015388, Written Opinion dated Apr. 25, 2019", 7 pgs.

"International Application Serial No. PCT US2019 015388, International Preliminary Report on Patentability dated Aug. 13, 2020", 9 pages.

* cited by examiner

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| ... | | |

FIG. 3A

Job Queue 224

| job_id | start_time | job_type | job_info |
|---|---|---|---|
| 00001 | 0600 | pull snapshot | target = m001 |
| 00002 | 0605 | convert | target = m001, platform = AWS |
| 00003 | 0610 | replicate | target = m003 |
| 00004 | 0615 | run analytics | target = m002 |
| 00005 | 0615 | trash collection | xxx |
| ... | | | |

FIG. 3B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | |
| ... | | |

Image Table 228

| im_id | im_location |
|---|---|
| m001.im1 | ... |
| m001.im1-2 | |
| m001.im2-3 | |
| m001.im3-4 | |
| m001.im4-5 | |
| ... | |

FIG. 3C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | |
| ... | | ... |
| m001.ss12 | 20171003.2100 | m001.im1, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

FIG. 4A

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | |
| ... | | |
| m001.ss12 | 20171003.2100 | m001.im1, ..., m001.im11-12 |

FIG. 4B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | |
| ... | | |
| m001.ss12 | 20171003.2100 | m001.im5, ...<br>m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |

FIG. 4C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | |
| ... | ... | ... |
| m001.ss12 | 20171003.2100 | m001.im5, ...<br>m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |
| m001.im5-1 | |

FIG. 4D

VM Package Data Structure 229

| ss_id | vmp_id | vmp_platform | vmp_location |
|---|---|---|---|
| m001.ss1 | m001.vmp1 | AWS | ... |
| m001.ss2 | m001.vmp2 | AWS | |
| m001.ss3 | m001.vmp3 | AWS | |
| m001.ss4 | m001.vmp4 | AWS | |
| m001.ss5 | m001.vmp5 | AWS | |
| m001.ss6 | | ... | |
| ... | | | |
| m001.ss12 | m001.vmp12 | | |

FIG. 5

CREATION OF VIRTUAL MACHINE PACKAGES USING INCREMENTAL STATE UPDATES

BACKGROUND

1. Technical Field

The present invention generally relates to managing and storing data, for example for backup purposes.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure. Another aspect is data portability across locations and platforms.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. However, various different platforms are offered for virtualization. While users may desire to have their applications and data be machine-agnostic, it typically is not easy to port applications and data between different platforms.

Thus, there is a need for better approaches to managing and storing data, particularly across different virtual machine platforms.

SUMMARY

Described herein are systems and methods that manage machine backups, including the creation of virtual machine packages that are sufficient to instantiate virtual machines corresponding to the backups. The virtual machine packages are created based on incremental updates of the target machine over time.

In one aspect, a compute infrastructure includes many machines, which may be either physical or virtual. From time to time, snapshots of the states of these target machines are pulled and saved, for example for backup purposes. Virtual machine packages corresponding to these snapshots are also created. A virtual machine package can be used to instantiate a virtual machine (VM) emulating the target machine with the saved state on a destination virtual machine platform. At some point, the initial VM package for a target machine is created by converting the snapshot to a VM package. However, this may take a long time. Later VM packages can instead be created by updating a prior VM package according to differences between the corresponding snapshots, rather than performing the full conversion process.

Other aspects include components, devices, systems, improvements, methods, processes, applications, computer readable mediums, and other technologies related to any of the above.

BRIEF DESCRIPTION OF THE DRAWINGS

FIGS. 3A-C are DMS tables that illustrate operation of the system of FIG. 2, according to one embodiment.

FIGS. 4A-4D are DMS tables that illustrate updating of snapshot images, according to one embodiment.

FIG. 5 is a VM package data structure, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
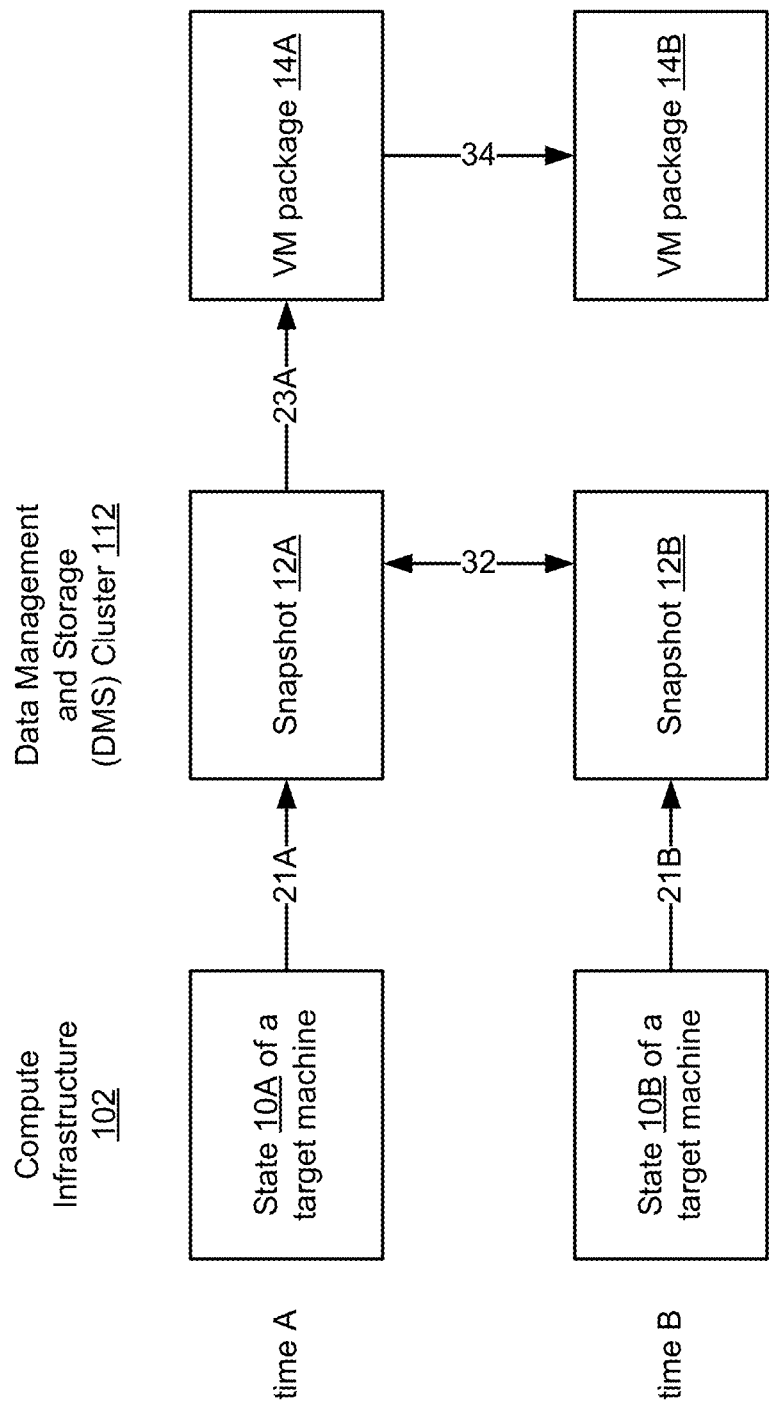
FIG. 1 is a block diagram illustrating the incremental creation of virtual machine (VM) packages, according to one embodiment.

FIG. 1 is a block diagram illustrating the incremental creation of virtual machine (VM) packages, according to one embodiment. In this example, a compute infrastructure 102 includes multiple machines which are managed by a data management and storage (DMS) cluster 112. One service provided is the creation of VM packages that are sufficient to allow instantiation of VMs emulating the target machines on VM platforms.

In FIG. 1, consider a particular machine in the compute infrastructure 102. At time point A, this target machine has a state 10A. The DMS cluster 112 takes 21A a snapshot 12A that captures the state 10A of the target machine. The target machine may be a virtual machine (VM) 104 or a physical machine (PM) 108 in a compute infrastructure 102 as further described below with respect to FIGS. 2A through 2B. The DMS cluster 112 also creates 23A a VM package 14A that is associated with the snapshot 12A, although this may occur at a later time. In one approach, it occurs within a certain time period after the corresponding snapshot has been saved.

If VM package 14A is the first package for the target machine, it may be created through a conversion process that converts the snapshot 12A to the VM package 14A. The snapshot is sufficient to instantiate a VM emulating the target machine with state 10A on a VM platform. The snapshot 12A may be a periodic backup of the target machine saved in the DMS cluster 112. The VM package 14A is sufficient to instantiate a VM emulating the target machine with state 10A on a destination VM platform. The destination VM platform is different form the VM platform where the snapshot 12A can be used to instantiate a VM. For example, the destination VM platform is AMAZON WEB SERVICES (AWS) and the VM package 14A is an AMAZON MACHINE IMAGE (AMI). The destination VM platform may also be VMWARE and the VM package 14A may be a template. The VM platform may be Azure and the VM package 14A may be a virtual hard disk (VHD). As further described below with respect to FIG. 2A, the VM package 14A may be stored on the DMS cluster 112 or a data storage system 122.

More generally, a VM package is a virtual machine image that provides the information required to launch a VM instance in a VM platform. For example, a VM package typically includes a template for the root volume for the VM that includes an operating system (e.g., Linux, Unix, or Windows) and any additional software (e.g., application servers, or applications) required to deliver a service. The VM package typically is a software stack that is ready to run on the VM platform. The VM platform is a host environment with computer software, firmware, hardware, or combinations (e.g., a hypervisor) that host VMs.

At a later time point B, the DMS cluster 112 takes 21B a second snapshot 12B to capture the state 10B of the target machine at that time. The corresponding VM package 14B could be created from snapshot 12B using a conversion process, but often the conversion process may take a long time and/or require significant compute resources. Instead, the VM package 14B is created as follows. The DMS cluster 112 determines 32 the differences between the snapshots 12A and 12B. The VM package 14A is then updated 34 according to these differences, thus creating the VM package 14B. The VM package 14B is sufficient to instantiate a VM on the destination platform that emulates the target machine with state 10B.

FIG. 1 shows the creation of VM packages 14 for a single VM platform. However, the DMS cluster 112 preferably can create VM packages for multiple VM platforms. Preferably, the snapshots 12 are agnostic to the VM platform. Accordingly, the DMS cluster 112 provides enhanced mobility because the state of the target machine can be instantiated on different VM platforms. The snapshots 12 may or may not be VM packages themselves.

Figure 2A:
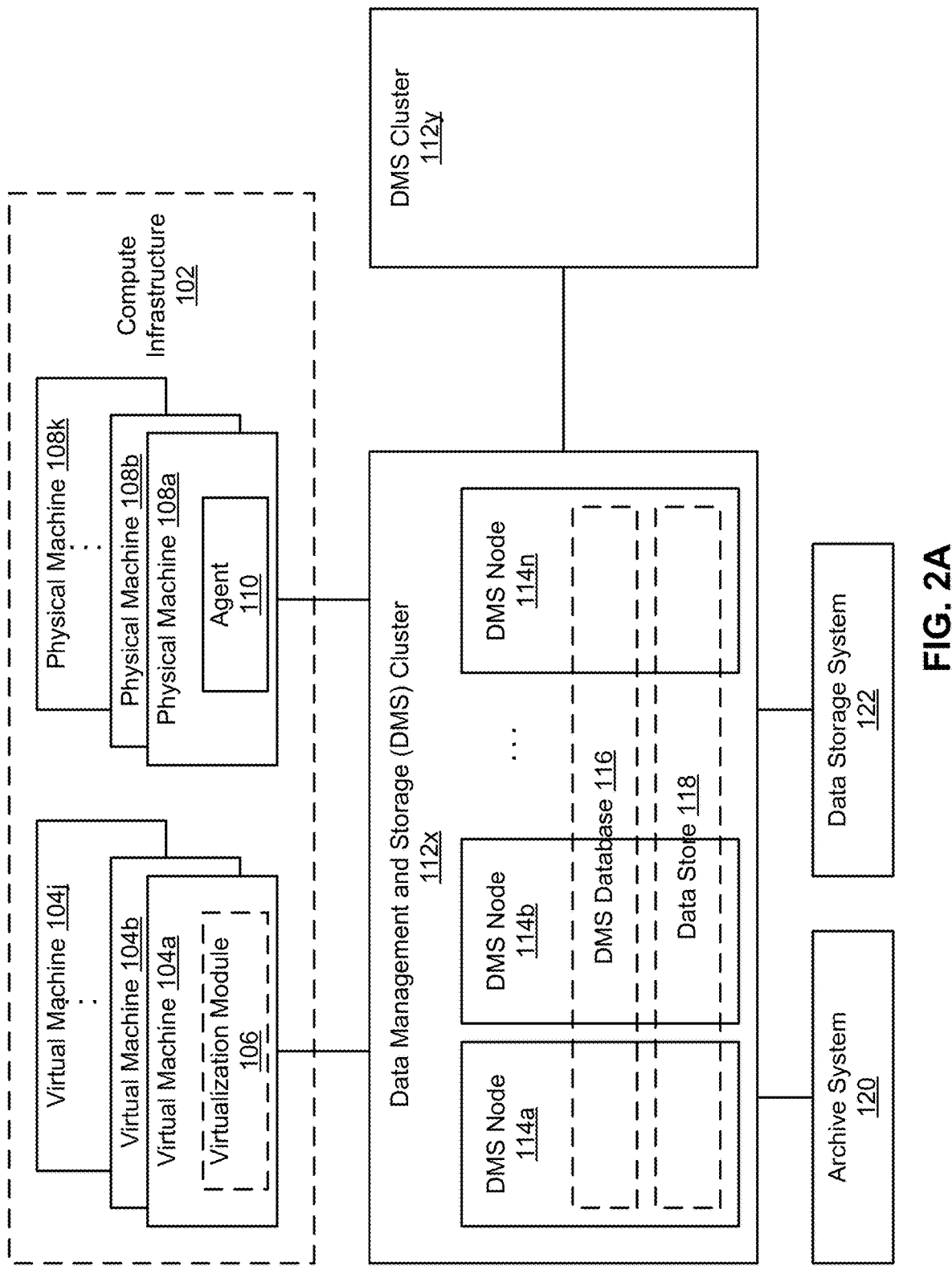
FIG. 2A is a block diagram of a system for managing and storing data, according to one embodiment.

FIGS. 2A through 5 provide additional details of an example implementation, including additional details of example implementations of the DMS cluster 112. FIG. 2A is a block diagram illustrating a system for managing and storing data, according to one embodiment. The system includes a data management and storage (DMS) cluster 112x, a secondary DMS cluster 112y and an archive system 120. The DMS system provides data management and storage services to a compute infrastructure 102, which may be used by an enterprise such as a corporation, university, or government agency. Many different types of compute infrastructures 102 are possible. Some examples include serving web pages, implementing e-commerce services and marketplaces, and providing compute resources for an enterprise's internal use. The compute infrastructure 102 can include production environments, in addition to development or other environments.

In this example, the compute infrastructure 102 includes multiple virtual machines (VMs) 104a-j and multiple physical machines (PMs) 108a-k. The VMs 104 can be implemented on different VM platforms. VMWARE, HYPER-V, AZURE, GOOGLE CLOUD PLATFORM (GCP), NUTANIX ACROPOLIS HYPERVISOR (AHV), KERNEL-BASED VIRTUAL MACHINE (KVM), and XEN are some examples. The physical machines 108a-n can also use different operating systems running various applications. For example, a physical machine 108a uses MICROSOFT WINDOWS running MICROSOFT SQL or ORACLE databases, or uses LINUX running a web server.

The DMS cluster 112 manages and stores data for the compute infrastructure 102. This can include the states of machines 104,108, configuration settings of machines 104, 108, network configuration between machines 104,108, and data stored on machines 104,108. Example DMS services includes backup, recovery, replication, archival, and analytics services. Additional examples include the creation of VM packages, as described in FIG. 1. The primary DMS cluster 112x enables near instant recovery of backup data. Derivative workloads (e.g., testing, development, and analytic workloads) may also use the DMS cluster 112x as a primary storage platform to read and/or modify past versions of data.

In this example, to provide redundancy, two DMS clusters 112x-y are used. From time to time, data stored on DMS cluster 112x is replicated to DMS cluster 112y. If DMS cluster 112x fails, the DMS cluster 112y can be used to provide DMS services to the compute infrastructure 102 with minimal interruption.

Archive system 120 archives data for the compute infrastructure 102. The archive system 120 may be a cloud service. The archive system 120 receives data to be archived from the DMS clusters 112. The archived storage typically is "cold storage," meaning that more time is required to retrieve data stored in archive system 120. In contrast, the DMS clusters 112 provide much faster backup recovery.

Data storage system 122 stores data for the compute infrastructure 102. The data storage system 122 may be a cloud service. The data storage system 122 receives data (e.g., VM packages 14) to be stored from the DMS clusters 112. The data storage system 122 provides a VM platform (e.g., the destination VM platform). In addition, the data storage system 122 can instantiate VMs from VM packages. In contrast to the archive system 120, the data storage system 122 is "primary storage" and stores data for quicker access by the DMS cluster 112x.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that collectively provide the DMS services, including managing and storing data. A DMS node 114 includes a software stack, processor and data storage. DMS nodes 114 can be implemented as physical machines or as virtual machines. The DMS nodes 114 are interconnected with each other, for example, via cable, fiber, backplane, and/or network switch. The end user does not interact separately with each DMS node 114, but interacts with the DMS nodes 114a-n collectively as one entity, namely, the DMS cluster 112.

The DMS nodes 114 are peers and preferably each DMS node 114 includes the same functionality. The DMS cluster 112 automatically configures the DMS nodes 114 as new nodes are added or existing nodes are dropped or fail. For example, the DMS cluster 112 automatically discovers new nodes. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, as will be described in more detail in FIG. 2. In the following examples, these are shown as tables but other data structures could also be used. The data store 118 contains the actual backup data from the compute infrastructure 102, for example snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 may have a similar structure. In one approach, data protection methods such as erasure coding is applied to encode data stored in the data store 118. Accordingly, if any DMS node 114 fails, the full DMS database 116 and/or data store 118 will still be available to the remaining DMS nodes and the full functionality of the DMS cluster 112 will still be available from the remaining DMS nodes. As a result, the DMS services can still be provided.

The DMS cluster 112 also creates VM packages as described in FIG. 1. The VM packages may be stored in the primary DMS cluster 112x, in the data store 122, or in the secondary DMS cluster 112y. Restoration of VMs 104 can therefore be provided by different computing entities shown in FIG. 2A. That is, VMs with the saved states of the VMs 104 can be instantiated from the primary DMS cluster 112x, the data storage system 122, or the secondary DMS cluster 112y. If multiple VM platforms are available or desired, users have the flexibility to select where to instantiate VMs.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104.

A physical machine 108 is a physical computing system that allows execution of operating systems as well as software applications such as a database application or a web server. In the following example, an agent 110 is installed on the physical machines 108 to facilitate backups of the physical machines.

The components shown in FIG. 1 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 1 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 2B:
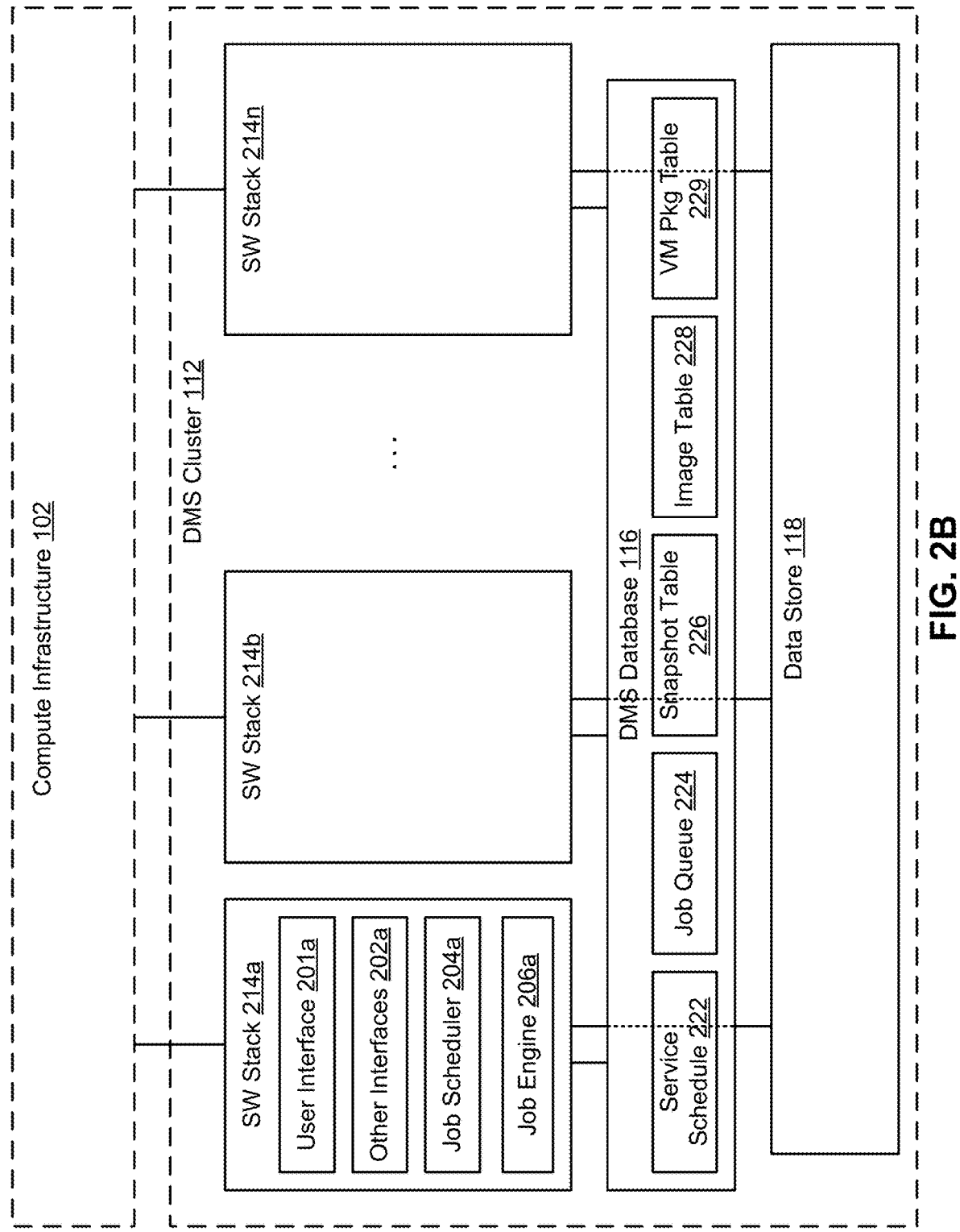
FIG. 2B is a logical block diagram of a data management and storage (DMS) cluster, according to one embodiment.

FIG. 2B is a logical block diagram illustrating an example DMS cluster 112, according to one embodiment. This logical view shows the software stack 214a-n for each of the DMS nodes 114a-n of FIG. 1. Also shown are the DMS database 116 and data store 118, which are distributed across the DMS nodes 114a-n. Preferably, the software stack 214 for each DMS node 114 is the same. This stack 214a is shown only for node 114a in FIG. 2. The stack 214a includes a user interface 201a, other interfaces 202a, job scheduler 204a and job engine 206a. This stack is replicated on each of the software stacks 214b-n for the other DMS nodes. The DMS database 116 includes the following data structures: a service schedule 222, a job queue 224, a snapshot table 226 and an image table 228. The DMS data base 116 may further include a VM package data structure 229 which indexes the VM packages, as further described with respect to FIG. 5.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics.

The software stack 214 also includes other interfaces 202. For example, there is an interface 202 to the compute infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), create VM packages, archive, etc. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224. Thus, a job scheduler 204j from one node might post a job, which is then pulled from the queue and executed by a job engine 206k from a different node.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into "images," which are stored in the data store 118. The snapshot table 226 describes which images make up each snapshot. For example, the snapshot of machine x taken at time y can be constructed from the images a,b,c. The image table is an index of images to their location in the data store. For example, image a is stored at location aaa of the data store 118, image b is stored at location bbb, etc. More details of example implementations are provided in FIGS. 4A through 4B below.

DMS database 116 also stores metadata information for the data in the data store 118. The metadata information may include file names, file sizes, permissions for files, various times such as when the file was created or last modified.

FIGS. 3-4 illustrate operation of the DMS system shown in FIG. 2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that DMS cluster can find the machine in the compute infrastructure. It is also identified by machine_id, which is a unique ID used internally by the DM cluster. In this example, there is a mix of virtual machines (VMxx) and physical machines (PMxx).

The services to be performed are defined in the SLA (service level agreement) column. Here, the different SLAs are identified by text: standard VM is standard service for virtual machines. Each SLA includes a set of DMS policies (e.g., a backup policy, a replication policy, an archival policy, and a conversion policy) that define the services for that SLA. For example, "standard VM" might include the following policies:

Backup policy: The following backups must be available on the primary DMS cluster 112x: every 6 hours for the prior 2 days, every 1 day for the prior 30 days, every 1 month for the prior 12 months.

Replication policy: The backups on the primary DMS cluster for the prior 7 days must also be replicated on the secondary DMS cluster 112y.

Archive policy: Backups that are more than 30 days old may be moved to the archive system 120.

Conversion Policy: For each new backup, create a VM package within 3 hours for the following VM platforms: AMI on AWS.

The underlines indicate time intervals that may vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job_id identifies a job and start_time is the scheduled start time for the job. job_type defines the job to be performed and job_info includes additional information for the job. Job 00001 is a job to "pull snapshot" (i.e., take backup) of machine m001. Job 00002 is a job to create a VM package for target m001 for the AWS platform. Job 00003 is a job to replicate the backup for machine m003 to the secondary DMS cluster. Job 00004 runs analytics on the backup for machine m002. Job 00005 is an internal trash collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m001. Each row of the snapshot table is a different snapshot and each row of the image table is a different image. The snapshot is whatever is being backed up at that point in time. In the nomenclature of FIG. 3C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "1" indicates this is a full image of the snapshot at time t1. The incremental difference is m001.im1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1. The ss_time is a timestamp of the snapshot, which is Oct. 1, 2017 at 3 am. im_list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

For virtual machines, pulling a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

From time to time, these tables and the corresponding data are updated as various snapshots and images are no longer needed or can be consolidated. FIGS. 4A-4D show an example of this. FIG. 4A shows the snapshot table and image table after backups have been taken for 3 days using the process described in FIG. 3A. However, if the service schedule requires 6-hour backups only for the past 2 days, then the 6-hour backups for the first day October 1 are no longer needed. The snapshot m001.ss1 is still needed because the service schedule requires daily backups, but snapshots .ss2, .ss3 and .ss4 can be deleted and are removed from the snapshot table, as indicated by the cross-hatching in FIG. 4B. However, the incremental images .im1-2, .im2-3 and .im3-4 are still required to build the remaining snapshots.

In FIG. 4C, the base image is updated from .im1 to .im5. That is, a full image of snapshot 5 is created from the existing images. This is a new row at the bottom of the image table 228. The im_list for snapshots .ss5 to .ss12 are also updated to stem from this new base image .im5. As a result, the incremental images .im1-2, .im2-3, .im3-4 and .im4-5 are no longer required and they can be deleted from the data store and from the image table 228. However, the data store now contains two full images: .im1 and .im5. Full images are usually much larger than incremental images. This redundancy can be addressed by creating a backwards incremental image .im5-1, shown in FIG. 4D as a new row in the image table 228. With the addition of this backwards incremental image, the full image .im1 is no longer needed.

As described previously, the job engines 206a also create VM packages for instantiating VMs, as described in FIG. 1. The snapshots 12 of FIG. 1 preferably are stored in the data store 118, as described in the above examples. In the following examples, the DMS cluster 112x creates the VM packages. The original snapshots are assumed to be stored in VMDK (Virtual Machine Disk) format and the resulting VM packages are AMI (AMAZON MACHINE IMAGES) used to instantiate VMs on AWS (AMAZON WEB SERVICES).

The first VM package (e.g., AMI) for a target machine is created as follows. A job engine 206 creates a storage volume (e.g., an EBS volume) on the data storage system 122. The job engine 206 may create the storage volume by interfacing with the data storage system 122. The storage volume has a storage capacity that is at least the size of the full image of the snapshot. The job engine 206 copies the full image into the storage volume (e.g., copies the raw disk image from VMDK to the EBS volume). The job engine 206 can read the full image of the snapshot from the data store 118. The job engine 206 may further install one or more drivers into the storage volume and/or make configuration changes to the storage volume such that the VM package can instantiate a VM in the destination VM platform. In this example, AWS volume drivers may be installed, in addition to configuration changes for the AWS platform. The job engine 206 may also take a snapshot of the EBS storage volume after the full image is written into the storage volume. This snapshot is used to determine the differences with other snapshots of the same target machine. The job engine 206 also runs a conversion process that converts the EBS storage volume to the VM package (AMI).

Once the first VM package has been created, later VM packages can be created using incremental conversions. Continuing the VMDK to AMI example above, once the second snapshot is taken, a job scheduler creates a second storage volume (e.g., EBS volume) based on the prior storage volume. The second storage volume is a copy of the earlier storage volume and then updated according to differences between the first and second snapshots. In the example of FIGS. 3A-4D, these differences are captured in the incremental images.

The incremental images can define the differences between snapshots based on different formats. As one example, the difference is defined based on a format that includes a disk offset and a change length (e.g., in bytes). As another example, it is defined based on a bitmap file representing the offset and length. As a further example, the differences are defined based on a format that includes changed sector numbers. The job engine 206 take a snapshot of the storage volume after it has been updated. This snapshot can be used to create later VM packages.

The job engine 206 also updates the VM package data structure to maintain associations between snapshots of the VMs 104 and the corresponding VM packages. FIG. 5 is a VM package data structure 229 that corresponds to the snapshot table 226 of FIG. 4A, according to one embodiment. The VM package data structure 229 indexes the VM packages created by the DMS cluster 112. Each row corresponds to a VM package. The VM package ID is given by vmp_id. In the nomenclature, m001.vmp1 is a VM package associated with the snapshot m001.ss1 of machine m001 taken at time t1. In the suffix ".vmp1", the .vmp indicates that this is a VM package and the 1 indicate the time t1. m001.vmp2 is a VM package associated with the snapshot m001.ss2 of machine m001 taken at time t2, and so on. The VM package m001.vmp2 is created by updating the VM package m001.vmp1 according to the differences in the incremental image m001.im1-2 (i.e., the difference between snapshots m001.ss1 and m001.ss2) vmp_platform indicates the VM platform, which in this example is AWS. vmp_location indicates where the VM package is stored. Note that the same snapshot (m001.ss1) may show up in multiple rows, for example if it is ported to multiple VM platforms.

When creating VM packages based on incremental images, multiple job engines 206 can write data to the storage volume concurrently to boost the data transfer efficiency. In addition, the job engine 206 create VM packages periodically according to a RPO as configured. The VM packages are created according to the time period as defined in the RPO. A user can configure to create VM packages on full images if the cost of maintaining storage volumes is expensive.

The description above is just one example. The various data structures may be defined in other ways and may contain additional or different information.

Figure 6:
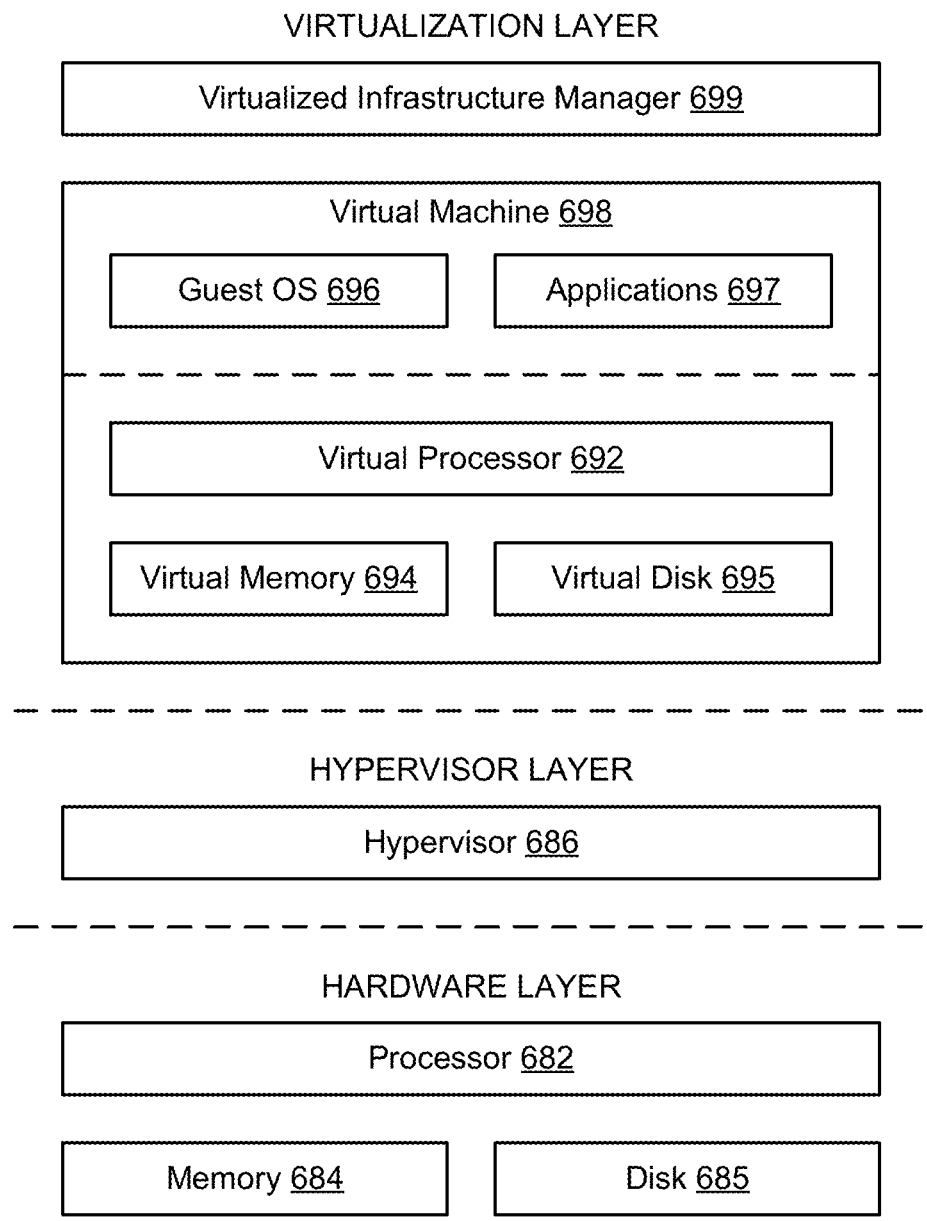
FIG. 6 is a block diagram of a virtual machine, according to one embodiment.

FIG. 6 is a block diagram of a server for a VM platform, according to one embodiment. The server includes hardware-level components and software-level components. The hardware-level components include one or more processors 682, one or more memory 684, and one or more storage devices 685. The software-level components include a hypervisor 686, a virtualized infrastructure manager 699, and one or more virtual machines 698. The hypervisor 686 may be a native hypervisor or a hosted hypervisor. The hypervisor 686 may provide a virtual operating platform for running one or more virtual machines 698. Virtual machine 698 includes a virtual processor 692, a virtual memory 694, and a virtual disk 695. The virtual disk 695 may comprise a file stored within the physical disks 685. In one example, a virtual machine may include multiple virtual disks, with each virtual disk associated with a different file stored on the physical disks 685. Virtual machine 698 may include a guest operating system 696 that runs one or more applications, such as application 697. Different virtual machines may run different operating systems. The virtual machine 698 may load and execute an operating system 696 and applications 697 from the virtual memory 694. The operating system 696 and applications 697 used by the virtual machine 698 may be stored using the virtual disk 695. The virtual machine 698 may be stored as a set of files including (a) a virtual disk file for storing the contents of a virtual disk and (b) a virtual machine configuration file for storing configuration settings for the virtual machine. The configuration settings may include the number of virtual processors 692 (e.g., four virtual CPUs), the size of a virtual memory 694, and the size of a virtual disk 695 (e.g., a 10 GB virtual disk) for the virtual machine 695.

The virtualized infrastructure manager 699 may run on a virtual machine or natively on the server. The virtualized infrastructure manager 699 corresponds to the virtualization module 106 in FIG. 2A and may provide a centralized platform for managing a virtualized infrastructure that includes a plurality of virtual machines. The virtualized infrastructure manager 699 may manage the provisioning of virtual machines running within the virtualized infrastructure and provide an interface to computing devices interacting with the virtualized infrastructure. The virtualized infrastructure manager 699 may perform various virtualized infrastructure related tasks, such as cloning virtual machines, creating new virtual machines, monitoring the state of virtual machines, and facilitating backups of virtual machines.

Figure 7:
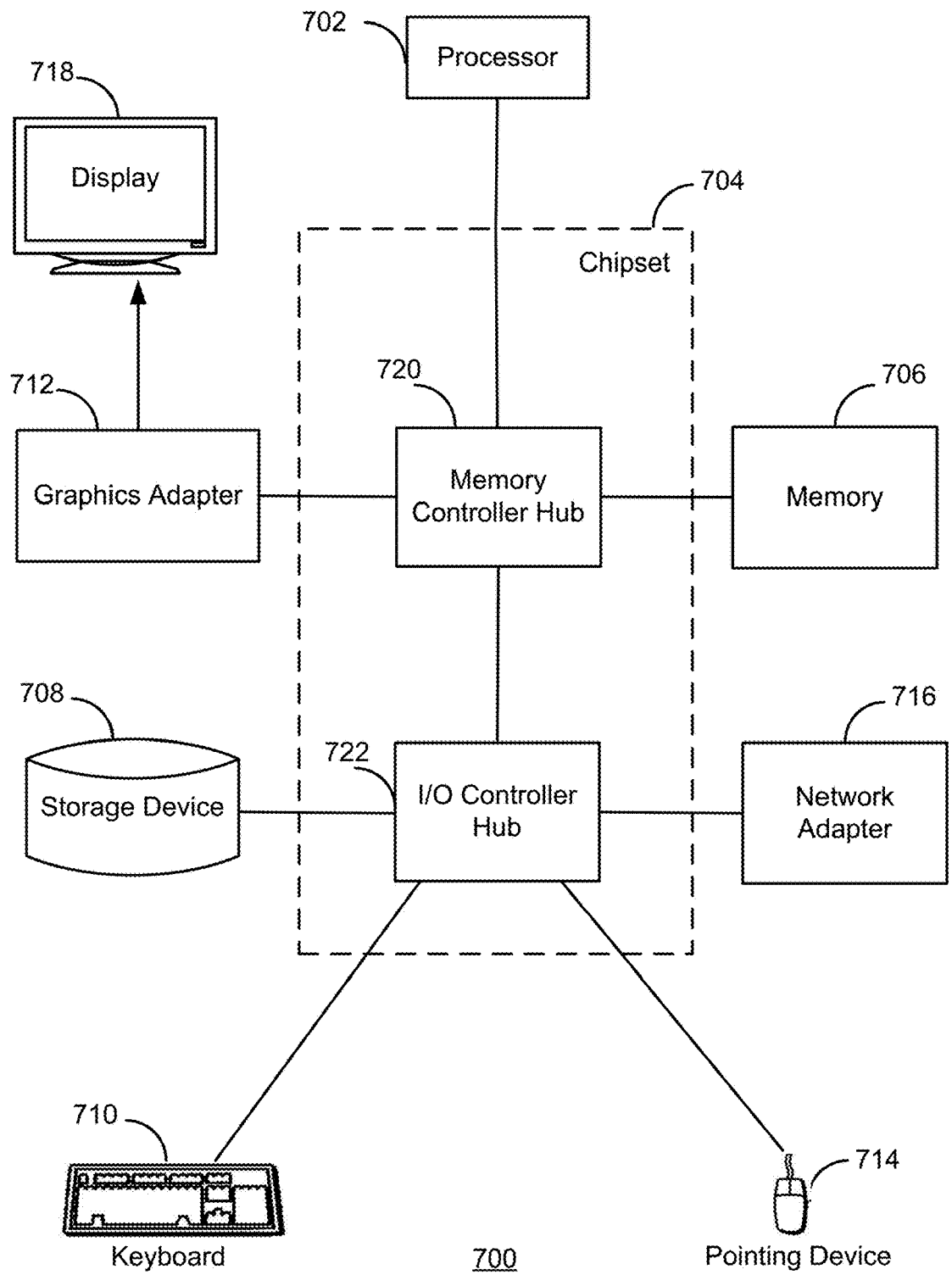
FIG. 7 is a block diagram of a computer system suitable for use in a DMS system, according to one embodiment.

FIG. 7 is a high-level block diagram illustrating an example of a computer system 700 for use as one or more of the components shown above, according to one embodiment. Illustrated are at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display device 718 is coupled to the graphics adapter 712. A storage device 708, keyboard 710, pointing device 714, and network adapter 716 are coupled to the I/O controller hub 722. Other embodiments of the computer 700 have different architectures. For example, the memory 706 is directly coupled to the processor 702 in some embodiments.

The storage device 708 includes one or more non-transitory computer-readable storage media such as a hard drive, compact disk read-only memory (CD-ROM), DVD, or a solid-state memory device. The memory 706 holds instructions and data used by the processor 702. The pointing device 714 is used in combination with the keyboard 710 to input data into the computer system 700. The graphics adapter 712 displays images and other information on the display device 718. In some embodiments, the display device 718 includes a touch screen capability for receiving user input and selections. The network adapter 716 couples the computer system 700 to a network. Some embodiments of the computer 700 have different and/or other components than those shown in FIG. 7. For example, the virtual machine 104, the physical machine 108, and/or the DMS nodes 114 in FIG. 2 can be formed of multiple blade servers and lack a display device, keyboard, and other components.

The computer 700 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 708, loaded into the memory 706, and executed by the processor 702.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for managing machine backups usable on different virtual machine (VM) platforms in a compute infrastructure, the method comprising:
    pulling and saving a first snapshot at a first point in time of a first state of a target machine in the compute infrastructure;
    creating a first virtual machine (VM) package associated with the first snapshot, by creating a first storage volume on a first destination VM platform, writing the first snapshot into the first storage volume, and converting the first storage volume for the first VM package usable on the first destination VM platform, wherein the first VM package includes associated information to instantiate a VM emulating the target machine with the first state on the first destination VM platform, the first VM package further including software that is ready to run on the first destination VM platform;
    pulling and saving a second snapshot at a second point in time of a second state of the target machine, wherein the second state occurs after the first state;
    creating a second VM package associated with the second snapshot for use on a second destination VM platform by creating a second storage volume based on the first storage volume, and updating the second storage volume on the second destination VM platform based on offsets and data size differences between the first snapshot and the second snapshot, wherein the second VM package is sufficient to instantiate the VM emulating the target machine with the second state usable on the second destination VM platform; and
    launching a VM instance using a virtual machine image of the first VM package in the first destination VM platform or using the second VM package in the second destination VM platform.

2. The method of claim 1, wherein the first or second destination VM platform is a host environment comprising computer software, firmware, hardware, or a hypervisor that creates and hosts virtual machines.

3. The method of claim 1, wherein first and second VM packages are created for at least two different destination VM platforms.

4. The method of claim 1, wherein the target machine is a physical machine.

5. The method of claim 1, wherein the target machine is a virtual machine.

6. The method of claim 1, wherein pulling and saving the first and second snapshots is performed as part of a backup service for the compute infrastructure.

7. The method of claim 1, further comprising:
    maintaining a VM package data structure that associates snapshots with VM packages, including associating the first snapshot with the first VM package and also associating the second snapshot with the second VM package.

8. The method of claim 1, wherein creating the first VM package further comprises:
writing a driver for the first destination VM platform into the first storage volume; and
configuring the first storage volume according to a configuration setting of the first destination VM platform.

9. The method of claim 2, wherein creating the first VM package further comprises:
converting the first storage volume to the first VM package, the first VM package including a root volume template.

10. The method of claim 1, wherein creating each of the first and second VM packages occurs within a predetermined time period after saving a corresponding snapshot.

11. In a data management and storage (DMS) cluster comprising a plurality of peer DMS nodes that service a compute infrastructure and a distributed data store implemented across the peer DMS nodes, a method comprising:
pulling and saving a first snapshot at a first point in time of a first state of a target machine in the compute infrastructure;
creating a first virtual machine (VM) package associated with the first snapshot, by creating a first storage volume on a first destination VM platform, writing the first snapshot into the first storage volume, and converting the first storage volume for the first VM package usable on the first destination VM platform, wherein the first VM package includes associated information to instantiate a VM emulating the target machine with the first state on the first destination VM platform, the first VM package further including software that is ready to run on the first destination VM platform;
pulling and saving a second snapshot at a second point in time of a second state of the target machine, wherein the second state occurs after the first state;
creating a second VM package associated with the second snapshot for use on a second destination VM platform by creating a second storage volume based on the first storage volume, and updating the second storage volume on the destination VM platform based on offsets and data size differences between the first snapshot and the second snapshot, wherein the second VM package is sufficient to instantiate the VM emulating the target machine with the second state usable on the second destination VM platform; and
launching a VM instance using a virtual machine image of the first VM package in the first destination VM platform or using the second VM package in the second destination VM platform.

12. A data management and storage (DMS) cluster for managing machine backups usable on different virtual machine (VM) platforms, the DMS cluster comprising:
a plurality of peer DMS nodes that autonomously service a compute infrastructure;
a distributed data store implemented across the peer DMS nodes;
wherein each of the peer DMS nodes includes a software stack for:
pulling a first snapshot at a first point in time of a first state of a target machine in the compute infrastructure;
creating a first virtual machine (VM) package associated with the first snapshot, by creating a first storage volume on a first destination VM platform, writing the first snapshot into the first storage volume, and converting the first storage volume for the first VM package usable on the first a destination VM platform, wherein the first VM package includes associated information to instantiate a VM emulating the target machine with the first state on the first destination VM platform, the first VM package further including software that is ready to run on the first destination VM platform,
pulling a second snapshot at a second point in time of a second state of the target machine, wherein the second state occurs after the first state;
creating a second VM package associated with the second snapshot, for use on a second destination VM platform by creating a second storage volume based on the first storage volume, and updating the second storage volume on the destination VM platform based on offsets and data sizes differences between the first snapshot and the second snapshot, wherein the second VM package sufficient to instantiate the VM emulating the target machine with the second state on the second destination VM platform; and
launching a VM instance using a virtual machine image of the first VM package in the first destination VM platform or using the second VM package in the second destination VM platform.

13. The DMS cluster of claim 12, wherein each of the peer DMS nodes further includes a software for:
maintaining a VM package data structure that associates snapshots with VM packages, including associating the first snapshot with the first VM package and also associating the second snapshot with the second VM package.

* * * * *